Sept. 23, 1969     R. E. PRICE ET AL     3,468,066
INDEXING MECHANISM FOR MACHINE TOOLS
Filed Oct. 18, 1966
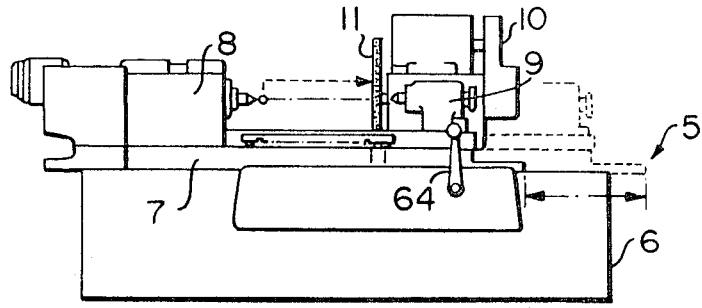
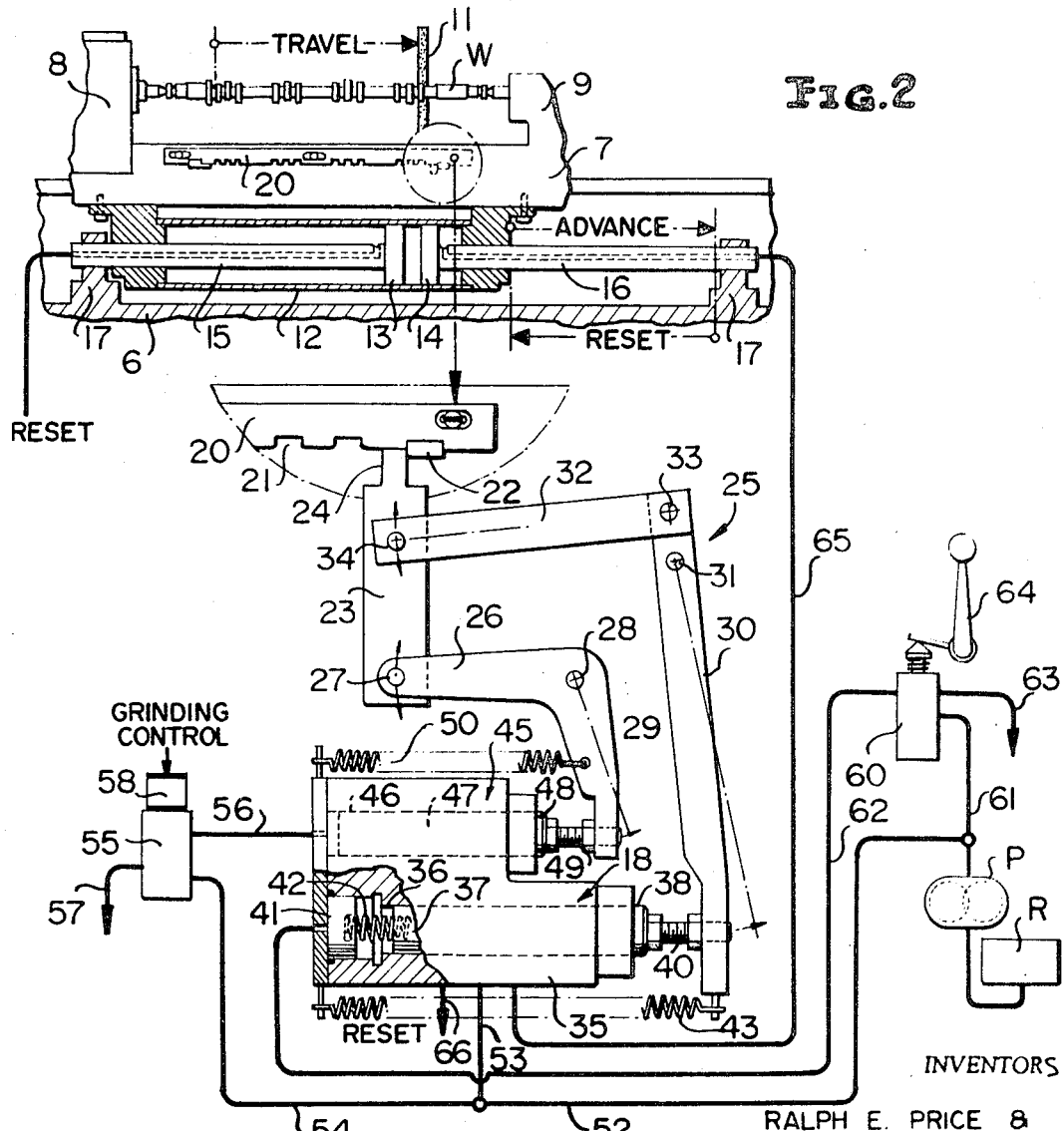
INVENTORS
RALPH E. PRICE &
ROBERT E. BRICKER
BY
Mason, Porter, Diller & Brown
ATTORNEYS United States Patent Office 3,468,066
Patented Sept. 23, 1969

3,468,066
INDEXING MECHANISM FOR MACHINE TOOLS
Ralph E. Price and Robert E. Bricker, Waynesboro, Pa., assignors, by mesne assignments, to Landis Tool Company, Waynesboro, Pa., a corporation of Delaware
Filed Oct. 18, 1966, Ser. No. 587,500
Int. Cl. B24b 5/42, 17/02, 9/04
U.S. Cl. 51—72
10 Claims

ABSTRACT OF THE DISCLOSURE

This disclosure relates to a spacing bar and plunger arrangement in a machine tool for indexing the movement of the work support or tool support between successive operative positions. The plunger is mounted for movement transverse to the spacing bar. Two pivoted members are differently spaced from the spacing bar and pivotally connected to the plunger at points also differently spaced from the spacing bar. The movements of the plunger are guided entirely by the spaced pivotal connections with the two pivoted members without the need for close fitting vertical and horizontal guide members so that the movements of the plunger are completely unrestricted by sliding friction and the indexing operation is performed quickly and with a minimum of frictional resistance.

---

This invention relates in general to new and useful improvements in machine tools, particularly cam grinders and other machines in which there is an indexing movement of the work support or tool support between successive operative positions.

The indexing of automatic camshaft grinding machines has been accomplished by means of a cooperating traverse index plunger and a spacing bar together with a traverse valve. For many years, it has been found desirable to provide a mechanical connection between the traverse index plunger and the traverse valve. When an index plunger is retracted from the spacing bar, the means for retracting the plunger releases almost immediately so that it is free to enter the next notch in the spacing bar. Ordinarily, the traverse movement occurs in time to prevent return of the plunger into the same notch. However, there is nothing to prevent the return of the plunger into the same notch from which it had been withdrawn if the traverse movement is slightly delayed. In order to prevent return of the plunger into the same notch, the traverse valve is shifted by a spring to traverse position. This movment of the valve causes the plunger to move out of line with the notch so that it will not return to the notch from which it has withdrawn. Thus, the plunger requires both a vertical and horizontal movement. The means for accomplishing this has required close fitting vertical and horizontal guide members. While this arrangement functions satisfactorily, it is expensive to build and requires a complicated pressure lubricating system.

In view of the foregoing, it is, therefore, a primary object of this invention to provide means for supporting the plunger for the required horizontal and vertical movement in which frictional resistance is substantially eliminated.

Another object of this invention is to provide means whereby the plunger is supported entirely on vertically spaced pivotal connections with the members which provide the vertical and horizontal movements of the plunger.

A typical disclosure of the prior mechanical connection between the traverse index plunger and the traverse valve is found in Patent No. 2,654,189, granted Oct. 6, 1953. In accordance with this invention, generally speaking, the means for effecting the vertical movement of the plunger has not been changed. The means for effecting vertical movement of the plunger still involves a pivotal connection of the actuating means to the lower end of the plunger. Also, the operating arm connecting the traverse valve and the plunger is substantially the same except that the connection between the operating arm and the plunger has been changed from a horizontally sliding member to a link, one end of the link being pivotally connected to the operating arm, and the other end of the link being pivotally connected to the plunger. This pivotal connection between the link and the plunger makes possible the elimination of all linear guide members because the pivotal connection provides the guide function. It also eliminates the complicated lubricating system required to lubricate the guide members.

In accordance with this invention, the pivotal connections which support the plunger are vertically spaced so as to guide the movement of the plunger vertically relative to the spacing bar. The vertical actuating member and the link connecting the plunger with the operating arm are not necessarily parallel or even horizontal when the plunger is in a normal position, that is, in the notch. The position of the plunger is not always vertical since it can be made to tilt by suitable arrangement of the relation between the plunger actuating means and their pivotal connections. Such an arrangement might be used to relieve the pressure between the plunger and the spacing bar at the time of retraction of the plunger.

From the foregoing, it will be seen that a further novel feature of the invention is the substitution of the pivotal connection of a link with the upper end of the plunger for the conventional sliding connection, together with the attendant elimination of the expensive friction producing sliding guide members. This arrangement permits the lower pivot connection, instead of serving merely to move the plunger up and down, to coact with the upper pivot connection to constrain the plunger to a predetermined movement, vertical or otherwise.

With the above and other objects in view that will hereinafter appear, the nature of the invention will be more clearly understood by reference to the following detailed description, the appended claims and the several views illustrated in the accompanying drawing:

FIGURE 1 is a front elevational view of a camshaft grinder equipped with an indexing mechanism in accordance with this invention.

FIGURE 2 is a schematic view with parts shown in elevation and other parts broken away and shown in section and shows the general details of the indexing mechanism.

Referring now to the drawing in detail, it will be seen that there is illustrated in FIGURE 1 a camshaft grinder which is generally referred to by the numeral 5. The camshaft grinder 5 includes the usual bed 6 which has mounted thereon for longitudinal sliding movement a carriage 7. The carriage 7 carries the usual headstock 8 and tailstock 9 for the mounting of a workpiece, such as the camshaft, the workpiece being illustrated in FIGURE 2 and being identified as workpiece W. The camshaft grinder 5 also includes the customary grinding wheel assembly 10 which includes a grinding wheel 11.

Referring now to FIGURE 2 in particular, it will be seen that longitudinal traversing movement of the carriage 7 is accomplished by means of a traverse cylinder 12 which is mounted on the underside of the carriage 7. The traverse cylinder 12 has positioned therein a pair of opposed pistons 13, 14 which are supported by piston rods 15, 16, respectively. The piston rods 15 and 16 are carried by suitable supporting members 17 mounted on the bed 6.

In the illustrated camshaft grinder 5, normal indexing movement of the carriage 7 will be from left to right and traversing movement of the carriage 7 is accomplished by delivering fluid under pressure into the cylinder 12 to the right of the piston 14 through the piston rod 16. The resetting of the carriage 7 is accomplished by admitting fluid under pressure into the cylinder 12 to the left of the piston 13 through the piston rod 15.

Fluid under pressure is supplied by means of a pump P which is conected to a suitable reservoir R. The flow of fluid under pressure from the pump P to the cylinder 12 is controlled by a traverse valve, which is generally referred to by the numeral 18. The manner in which the traverse valve 18 is controlled to periodically supply fluid to the cylinder will be described in detail hereinafter.

The carriage 7 has suitably secured thereto a spacing bar 20 with notches 21 formed therein in accordance with the arrangement of the axially spaced portions of the workpiece W which are to be ground. The spacing bar 20 is also provided with a stop 22. The bed 6 carries for cooperation with the spacing bar 20 a plunger 23. The plunger 23 is provided with an upper end 24 of a size to be readily receivable within the notches 21. The plunger 23 cooperates with the spacing bar 20 and the traverse valve 18 to effect the indexing of the carriage 7 and the workpiece W carried thereby during the sequential grinding of the axially spaced portions of the workpiece.

The plunger 23 is supported by special linkage in accordance with this invention, the linkage being generally referred to by the numeral 25. The linkage 25 includes a lower lever member 26 which is pivotally connected to the lower part of the plunger 23 by means of a pivot pin 27. The lever 26 is pivotally mounted on a pivot pin 28. It is to be noted that the lever 26 is part of a bell crank type lever and has integrally connected thereto a lever 29 which is utilized to pivot the lever 26 and effect the vertical movement of the plunger 23 in a manner to be described in detail hereinafter.

The linkage 25 includes an operating arm 30 which has the lower part thereof operatively associated with the traverse valve 18. The upper portion of the operating arm 30 is mounted on a pivot pin 31 for pivotal movement. The upper end of the operating arm 30 is connected to the upper portion of the plunger 23 by means of a link 32. The right end of the link 32 is connected to the operating arm 30 by means of a pivot pin 33 while the left end of the link 32 is connected to the plunger 23 by means of a pivot pin 34.

It is to be noted that the specific structural details of the mounting of the various components of the linkage 25 have not been shown. However, it is to be understood that the mountings and the connections are to be mechanically feasible ones. The supporting of the lever 26 on the pivot pin 28 and the operating arm 30 on the pivot pin 31 is such that the movement thereof is substantially restricted to a predetermined plane or planes. In a like manner, the twisting movement of the link 32 relative to the operating arm 30 is restricted by the pivotal connection therebetween of which the pivot pin 33 is a part. Further, it is to be understood that the pivot pins 27 and 34 have suitable bearings within the plunger 23 and the respective ones of the lever 26 and the link 32 so as to firmly support the plunger 23 without the requirement of any auxiliary guides.

It is to be noted that the valve 18 is formed in an overall housing 35 having a stepped cylinder forming bore 36 formed in the lower portion thereof. In the right-hand portion of the bore 36 there is positioned a valve member 37 which has an end portion 38 projecting out of the housing 35 and attached to the operating arm 30 by means of an adjustable member 40. In the left end of the bore 36 there is positioned a piston 41 which generally opposes the left end of the valve member 37 and is spaced therefrom. A compression spring 42 extends between the piston 41 and the valve member 37 and has the opposite ends thereof seated therein. It will be readily apparent that when the piston 41 is moved to the right, the spring 42 is compressed and the valve member 37 is resiliently urged to the right. Movement of the valve member 37 to the right is resisted by a tension spring 43 which has one end thereof anchored to the bottom of the operating arm 30 and the opposite end thereof anchored to the left side of the housing 35. It is to be understood that the force exerted by the spring 42 on the valve member 37, when the piston 41 is moved to the right, is greater than the force exerted thereon by the spring 43.

The housing 35 also carries a combined valve and fluid motor 45. The upper portion of the housing 35 is provided with a cylinder defining bore 46 in which there is slidably mounted a combined piston and valve member 47 which has an end portion 48 projecting to the right of the housing 35. Adjustable member 49 connected to lever 29 is in abutting relation to said end portion 48. The lower end of the lever 29 is normally urged to the left by means of a tension spring 50 which has one end thereof anchored to the lever 29 and the opposite end thereof anchored on the left end of the housing 35.

A fluid line 52 extends from the pump P and has a branch 53 leading into the inlet of the valve 18 and a branch 54 leading to a valve 55. The valve 55 controls the flow of fluid from the branch 54 into a fluid line 56 which opens into the left end of the cylinder 46 whereby the combined valve member and piston 47 may be urged to the right under fluid pressure against the resistance of the spring 50. The valve 55 also has a suitable return line 57. The valve 55 is a solenoid actuated valve and includes a solenoid 58 which is automatically electrically actuated in a manner which is not a part of this invention at the end of the grinding operation on a portion of the workpiece W.

The movement of the piston 41 to the right is controlled by means of a valve 60 which has a fluid line 61 extending from the pump P connected thereto. A second fluid line 62 extends from the valve 60 to the left end of the cylinder bore 36. A return line 63 is also connected to the valve 60 for returning fluid to the reservoir R. The operation of the valve 60 is controlled by a cycle start lever 64.

The fluid system of the grinder 5 also includes a fluid line 65 which extends from the valve 18 to the piston rod 16. A further fluid line 66 extends from the valve 18 to the piston rod 15 for effecting the resetting of the carriage 7.

OPERATION

In the position shown in the drawing, the carriage 7 is in its extreme left-hand position with the index plunger 23 retracted and bearing against the right-hand spacing bar stop 22. The travers valve loading piston 41 is in its left hand or reset position. Valve 37 is in center position and prevents the flow of fluid under pressure to either end of traverse cylinder 12.

Plunger 23 is always straight, that is, in this case, vertical, except when the carriage is traversing in either direction for grind or reset.

In the grind direction, that is, with the carriage moving to the right and stopping intermittently to grind successive portions of a workpiece, plunger 23, when retracted from notch 21 for indexing, tends to pivot to the left about its lower pivot in response to the pressure of piston 41, spring 42, overcoming spring 43 to hold valve 37 in right hand or traverse right position, and arm 30 in counter-clockwise position. Piston 41 remains under pressure during the grinding of successive cam portions.

In the reset direction, the pressure on piston 41 is dropped and plunger 23, when retracted from the last notch, pivots to the right about its lower pivot in response to spring 43 which overcomes spring 42 when the pressure is dropped on piston 41.

At the beginning of a grinding operation, the cycle start lever 64 is moved to the left and pressure is applied to shift the piston 41 to the right in which position it compresses the spring 42. The spring 42, when compressed, overcomes the tension of the spring 43 and shifts the valve member 37 further to the right, this being possible, since the plunger 23 is not in one of the notches 21. The shifting of the valve member 37 to the right results in the flow of fluid under pressure through the fluid line 65 into the cylinder 12 to the right of the piston 14, thus moving the carriage 7 and the spacing bar 20 carried thereby to the right. It is pointed out at this time that the piston 41 remains in its spring loading position until all of the portions of the workpiece W have been ground.

It is to be understood that the plunger 23 is urged towards the spacing bar 20 by the action of the spring 50 on the lever 26. As soon as the first notch 21 becomes aligned with the plunger 23, the plunger 23 moves upwardly into the notch. The movement of the carriage 7 to the right continues until the left side of the notch engages the plunger 23, shifting the upper end 24 of the plunger 23 to the right. The movement of the upper end 24 of the plunger 23 to the right results in the movement of the link 32 to the right and the pivoting of the operating arm 30 about the pivot pin 31 in a clockwise direction. The force exerted by the spacing bar 20 on the plunger 23 and transmitted to the operating arm 30 is sufficient to overcome the differential in forces of the springs 42 and 43 and as a result, the valve member 37 is moved to the left to a center position in which position the fluid supply to the fluid line 65 is discontinued and the force urging the carriage to the right is removed. When the upper end 24 of the plunger 23 drops into a notch 21, the upward movement of said plunger causes a clockwise movement of the levers 26 and 29 about pivot pin 28. A limit switch (not shown) is actuated by this movement to advance the grinding wheel 11 for a grinding operation.

It is to be understood that after the particular grinding operation has been completed, the solenoid 58 will be automatically energized and fluid under pressure is delivered to the left end of the cylinder bore 46 through the fluid line 56 so as to move the levers 26 and 29 in a counterclockwise direction about the pivot pin 28 and to retract the plunger 23. The spring 42 is again effective to shift the valve member 37 to the right to continue the indexing of the carriage 7 to the next position.

It is to be noted that the lever 26 and the link 32 are differently spaced from the spacing bar 20 and the movements of the plunger 23 are guided entirely by the vertically spaced pivotal connections thereof with the lever 26 and the operating arm 30. With this arrangement, the vertical and horizontal movements of the plunger 23 are completely unrestricted by sliding friction and the indexing operation is performed quickly and with a minimum of frictional resistance. In operation, the plunger 23 is not confined to a vertical position. In fact, the location of the respective pivots with relation to the linkage and the dimensions of the linkage elements may be such as to tilt the plunger 23 slightly and to reduce the pressure between the plunger 23 and the side of the spacing bar notch 21 as the plunger is retracted. For example, the pivot pin 28 of the lever 26 may be in such a position that when the lever is moved in a counterclockwise direction to retract the plunger 23, the lower end of the plunger is moved slightly to the left causing the plunger 23 to rotate clockwise about the pivot pin 34 sufficient to reduce the pressure between the plunger 23 and the side of the spacing bar notch 21 so that retraction of the plunger is effected with a minimum of resistance at this point.

It is to be noted that the vertical retracting movement of the plunger 23 is not transmitted to the operating arm 30 because the link 32 connecting the plunger 23 with the operating arm is pivoted by means of the pivot pin 33 in the upper end of the operating arm. Thus, the operating arm 30 is actuated only in connection with the horizontal movement of the plunger 23. This movement of the plunger 23 occurs in one direction in response to movement of the valve member 37 by the spring 42. In the other direction, the plunger 23 is moved after entering one of the spacing bar notches 21. The carriage 7 and the spacing bar 20 continue to move after the plunger 23 enters a notch 21 and through the link 32 rotates the operating arm 30 until the valve member 37 is moved to its central position to stop the traverse movement of the carriage 7.

The valve member 37 being spring urged to the right by the spring 42, as soon as the plunger 23 is withdrawn from a notch 21, the operating arm 30 is rotated in a counterclockwise direction with the result that the link 32 moves to the left. This rotates the plunger 23 in a counterclockwise direction about the pivot pin 27 and automatically misaligns the plunger 23 with respect to the spacing bar notch 21 from which it was just removed. Therefore, even though the valve 55 may be opened for only a short period, there is no possibility of the plunger 23 returning into the same notch 21.

It is to be understood that although the invention has been specifically illustrated and described with respect to a camshaft grinder, the indexing mechanism is not so restricted in application. It may be readily utilized in conjunction with other types of machine tools, and the utilization thereof in conjunction with the indexing of rotating machinery is readily feasible. Therefore, while only a preferred embodiment of the invention has been specifically illustrated and described herein, it is to be understood that minor variations in the indexing mechanism may be made without departing from the spirit and scope of the invention, as defined by the appended claims.

We claim:
1. In a machine having a stationary member,
 (a) a movable member,
 (b) indexing means for sequentially positioning said movable member in predetermined positions, said indexing means comprising
 (c) means for effecting intermittent movement of said movable member including
 (d) a spacing bar on one of said members and having longitudinally spaced notches corresponding to work positions of said machine,
 (e) a plunger on the other of said members,
 (f) and means for guiding said plunger in a path to engage and disengage successive notches comprising pivoted members differently spaced from said spacing bar and pivotally connected to said plunger at points also differently spaced from said spacing bar.
2. In the machine of claim 1 wherein
 (a) said indexing means also includes means for moving said plunger toward and away from said spacing bar.
3. In the machine of claim 1 wherein
 (a) said means for effecting intermittent movement includes control means operable by said plunger in response to movement of said plunger after seating in said spacing bar due to the movement of said movable member relative to said stationary member to stop the movement of said movable member.
4. In the machine of claim 1 wherein
 (a) said means for effecting intermittent movement includes a control device,
 (b) an operating arm for said control device, and
 (c) one of said pivoted members being connected to said operating arm for moving said control device to a motion stopping position in response to movement of said plunger after seating in said spacing bar due to the movement of said movable member relative to said stationary member.

5. In the machine of claim 1 wherein
   (a) said means for effecting intermittent movement includes a fluid motor,
   (b) a source of pressurized fluid,
   (c) a control valve for selectively operably connecting said fluid motor to said pressurized fluid source,
   (d) an operating arm for said control valve, and
   (e) one of said pivoted members being connected to said operating arm for moving said control valve to a motion stopping position in response to movement of said plunger after seating in said spacing bar due to the movement of said movable member relative to said stationary member.

6. In a machine tool particularly constructed for performing a preset series of operations on axially spaced portions of a workpiece,
   (a) a stationary base member,
   (b) a movable carrier member mounted on said base member for longitudinal movement, and
   (c) indexing means for sequentially longitudinally positioning said carrier member in preset positions, said indexing means comprising:
   (d) a fluid motor connected to said carrier member for imparting longitudinal movement thereto,
   (e) a source of pressurized fluid,
   (f) control means for selectively operatively connecting said fluid motor to said fluid source;
   (g) a spacing bar on one of said members and having longitudinally spaced notches corresponding to notches corresponding to axially spaced portions of a predetermined workpiece,
   (h) a plunger on the other of said members,
   (i) and means supporting said plunger for movement into and out of interlocking engagement with said spacing bar comprising
   (j) a pair of vertically spaced, pivotally mounted levers, one of which is pivotally connected to the upper portion of said plunger, the other of which is pivotally connected to the lower portion of said plunger, whereby to restrict said plunger to a predetermined path of travel,
   (k) and means operable through said levers for effecting the movement of said plunger relative to said spacing bar.

7. In the machine tool of claim 6 wherein
   (a) said levers are of unequal lengths to effect a rocking of said plunger as said lever is retracted from the spacing bar to free said plunger from said spacing bar.

8. In the machine tool of claim 6 wherein
   (a) said control means includes a valve and a pivotally mounted operating arm connected to said valve, and
   (b) one of said pivoted members being connected to said operating arm for moving said control valve to a motion stopping position in response to movement of said plunger after seating in said spacing bar due to the movement of said movable member relative to said stationary member.

9. The machine tool of claim 6 wherein
   (a) said machine tool is a grinder,
   (b) said base member supports a grinding wheel,
   (c) and said carrier member has means for supporting a workpiece.

10. In the machine of claim 1 wherein
    (a) said pivoted members provide the only means for guiding said plunger whereby said plunger may be moved along said path unrestricted by sliding friction.

References Cited

UNITED STATES PATENTS

| | | | |
|---|---|---|---|
| 2,015,414 | 9/1935 | Steiner | 51—72 |
| 2,151,666 | 3/1939 | Silven. | |
| 2,535,549 | 12/1950 | Price. | |
| 2,654,189 | 10/1953 | Dunn | 51—101 |
| 2,708,816 | 5/1955 | Balsiger | 51—101 X |

ROBERT C. RIORDON, Primary Examiner

D. G. KELLY, Assistant Examiner

U.S. Cl. X. R.

51—105; 91—37